United States Statutory Invention Registration [19]

[11] Reg. Number: H470

Stern et al. [43] Published: May 3, 1988

[54] MILLIMETER WAVE MICROSTRIP CIRCULATOR UTILIZING HEXAGONAL FERRITES

[75] Inventors: Richard A. Stern, Allenwood; Richard W. Babbitt, Fair Haven, both of N.J.

[73] Assignee: The United States of America as represented by the Secretary of the Army, Washington, D.C.

[21] Appl. No.: 887,413

[22] Filed: Jul. 18, 1986

[51] Int. Cl.[4] ..... H01P 1/32; H01P 3/08
[52] U.S. Cl. ..... 333/1.1; 333/238
[58] Field of Search ..... 333/1.1

[56] References Cited

U.S. PATENT DOCUMENTS

| | | | |
|---|---|---|---|
| 3,015,787 | 1/1962 | Allin et al. | 333/1.1 |
| 3,101,456 | 8/1963 | Brown, Jr. et al. | 333/1.1 |
| 3,456,213 | 7/1969 | Hershenov | 333/1.1 |
| 4,459,567 | 7/1984 | Stern et al. | 333/24.2 |
| 4,542,357 | 9/1985 | Stern et al. | 333/24.2 |

OTHER PUBLICATIONS

Brigginshaw et al, *Developments of MIC Circulators From 1 to 40 Ghz*, IEEE Trans. on Magnetics, Sep. 1975, pp. 1273–1275.

Lax et al, *Microwave Ferrites & Fernmagnetics*, McGraw-Hill, N.Y., 1962, pp. 135, 136, 636 and title page.

Von Aulock et al, *Linear Ferrite Devices for Microwave Applications, Academic Press, N.Y., 1968, pp. 9–11 and title page.*

Soohoo, *Theory and Application of Ferrites, Prentice-Hall, N.J., 1960, pp. 74, 78 and title page.*

Clarricoats, *Microwave Ferrites, John Wiley & Sons, 1961, N.Y., p. 51 & title page.*

*Primary Examiner*—Stephen C. Buczinski
*Assistant Examiner*—Linda J. Wallace
*Attorney, Agent, or Firm*—Sheldon Kanars; Jeremiah G. Murray; John T. Rehberg

[57] ABSTRACT

A millimeter-wave circulator for microstrip use. The device employs an hexagonal ferrite element to selectively direct the propagation of electromagnetic energy through a Y-junction circulator. The device does not require an external biasing magnet and provides improved bandwidth for high frequency operation.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MILLIMETER WAVE MICROSTRIP CIRCULATOR UTILIZING HEXAGONAL FERRITES

The invention described herein may be manufactured, used and licensed by or for the Government without payment to me or any royalty thereon.

BACKGROUND OF THE INVENTION

1. Field of the Invention:

This invention relates generally to millimeter wave devices and more particularly to millimeter wave circulators utilizing ferrite components.

2. Description of the Prior Art

A circulator is a high frequency device which directs electromagnetic input power therethrough in a non-reciprocal manner. Operation of a circulator may be compared to a turnstile having ports distributed about its circumference. Power entering the first port exits at the second port and power entering the second port exits at the third port, etc. so that the circulation of power through the circulator is consistently in the same direction. Circulators are used extensively in radar, for example, to provide isolation between outgoing power from transmitter (e.g. first port) to antenna (second port) and incoming power from the same antenna to the receiver (third port). The non-reciprocal property of a circulator is governed by a non-reciprocal element located at the junction of three (or more) transmission lines which form the ports of the circulator. Typically, the non-reciprocal element is a spinel type ferrite, such as LiZn or NiZn. In circulators employing spinel ferrites, it is necessary to bias the ferrite element with an external magnet, to achieve power flow in the preferred direction(s).

The biasing magnetic field is oriented in a direction perpendicular to the plane of the junction and the transmission lines. The direction of circulation can be reversed by reversing the direction of the biasing magnetic field. For example, in a three port circulator, if an upward orientation of the biasing magnetic field causes power to preferentially flow from port 1 to port 2 and from port 2 to port 3 and from port 3 to port 1, then a downward orientation of the biasing magnetic field would cause power to preferentially flow from port 1 to port 3, and from port 3 to port 2 and from port 2 to port 1.

With the advent of microelectronics, there is a growing need for high-frequency circulator devices that lend themselves to microwave and millimeter wave integrated circuit structures, such as microstrips. An example of a microstrip-compatible circulator is provided by U.S. Pat. No. 3,456,213, entitled "Single Ground Plane Junction Circulator Having Dielectric Substrate" issued to Hershenov. There is also a need for light, broadband circulators which require little or no external magnetic bias, thus reducing cost weight and complexity.

BRIEF SUMMARY OF THE INVENTION

It is an object of the present invention to provide an inexpensive compact millimeter wave circulator.

It is another object of the present invention to provide a millimeter wave circulator which requires little or no external magnetic field bias.

A further object of the present invention is to provide a millimeter wave circulator which is compatable with microstrip technology and capable of integral fabrication with microstrip circuits.

Still another object of the present invention is to provide a millimeter wave circulator with a wide transmissive bandwidth.

The present invention, does not utilize a spinel ferrite as the non-reciprocal element. Instead, the present device employs an anisotropic aligned uniaxial polycrystalline hexagonal ferrite as its non-reciprocal element. As will be further elaborated below, use of the aforementioned hexagonal ferrite as the circulator's non-reciprocal element, obviates the need for the traditionally-employed biasing magnet because the necessary bias is provided by the hexagonal ferrite's own "built-in" anisotropy field. Furthermore, the large "build-in" anistropy field of the hexagonal ferrite raises the ferrimagnetic resonance frequency of the material and thus permits broader bandwidth operation.

A variety of hexagonal ferrites were developed in the 1960s, but their application to circulators has not been pursued. Some examples of applications of hexagonal ferrites to other components are contained in U.S. Pat. No. 4,459,567 entitled "Dielectric Waveguide Ferrite Resonance Isolator," issued to the present inventors, and U.S. Pat. No. 4,542,357 entitled "Dielectric Waveguide Ferrite Resonance Isolator" also issued to the present inventors. Both of the above-mentioned patents utilize hexagonal ferrites to provide waveguide isolators without requiring the use of external magnetic bias. Examples of hexagonal ferrite compounds are: SrM, BaM, and NiCoW, where M, and W represent substitutional groups well known to those skilled in the art. Some specifice examples of such compounds are $SrO.(5.9\text{-}\delta)\ Fe_2O_3.\delta Al_2O_3$, where the parameters $\delta$ may assume a range of values from 0 to 1.3 yielding compounds such as $SrO.(4.90)\ Fe_2O_3.(1.00)\ Al_2O_3$ or $SrO.(5.9)\ Fe_2O_3$ or $SrO.(5.4)\ Fe_2O_3.(0.5)\ Al_2O_3$. Barium ferrite ($Ba\ Fe_{12}\ O_{19}$) is another specific example of an hexagonal ferrite. Some additional examples of hexagonal ferrite materials are listed in the aforementioned U.S. Pat. No. 4,542,357 which is incorporated herein by reference. Hexagonal ferrites differ from traditionally-used spinel ferrites in that hexagonal ferrites are grain-oriented uniaxial materials having high anisotropy fields.

Generally, all magnetic materials exhibit magnetrocrystalline anisotropy. However, the phenomenon is usually unobservable because ordinary ferrites and other magnetic oxides are commonly found in unoriented polycrystalline form. That is, the materials consist of many thousands of small crystallites, randomly oriented with respect to one another. Although each crystallite has a effective anisotropy field with a preferred orientation, the random orientation of crystallites causes the entire polycrystalline material to be isotropic. Consequently there is no preferred direction of magnetization for the sample as a whole and there is no net anisotropy.

Spinel ferrites are characterized by the presence of many randomly-oriented crystallites which must be aligned by an external biasing magnet to be effective in microwave applications such as isolators or circulators. However, hexagonal ferrites have a high "built-in" anisotropy field which effectively supplements or may even replace an externally-applied biasing magnet.

Hexagonal ferrites, of the types previously described, are uniaxial, that is, they have a single axis (usually termed the c-axis) along which the magnetization is aligned. During fabrication, individual magnetic domains are aligned in the same direction.

Hexagonal ferrite compounds are prepared by those skilled in the art using the same general procedures used in the preparation of other polycrystalline magnetic oxides.

Both spinel and hexagonal ferrites exhibit ferrimagnetic resonance at a frequency, $\omega_r$, given approximately by the formula:

$$\omega_r = \gamma(H_{ap} + H_{anis})$$

where $\omega_r$ is the ferrimagnetic resonance frequeny (MHz)

$\gamma$ is the gyromagnetic ratio (approximately 2.8 MHz/Oersted)

$H_{ap}$ is the external applied field (Oersteds)

$H_{anis}$ is the effective anisotropy field of the ferrite material (Oersteds)

The above equation illustrates that the anisotropy field, $H_{anis}$ can be used to effectively replace an applied field, $H_{ap}$, to produce resonance. If the anisotropy field is large enough, the applied field required for a given resonance can be zero, or, at the most, very small. As mentioned before, hexagonal ferrites have large anisotropy fields, $H_{anis}$, whereas spinel ferrites have comparatively low anisotropy fields. At millimeter-wave frequencies spinel ferrites do not possess a sufficiently large anisotropy field, $H_{anis}$, to achieve resonance without the presence of a substantial externally applied field. $H_{ap}$. However, hexagonal ferrites can be fabricated with a large anisotropy field, $H_{anis}$, so that sufficiently high resonance frequencies can be obtained without the use of external biasing magnet.

The aforementioned resonance phenomenon is characterized by absorption of a high percentage of the electromagnetic energy incident upon the ferrite material. Accordingly, for circulator applications, in which transmission of electromagnetic energy in a preferred direction is desired, operation at frequencies just above (or just below) resonance is desirable. Since it has been experimentally determined that a greater operating bandwidth is achievable the closer the device is operated to resonance (but not precisely at resonance, of course), achievement of the previously-mentioned high resonance frequencies is a prerequisite for wide bandwidth millimeter-wave operation.

For example, an hexagonal ferrite with an anisotropy field of 10,000 Oe, (readily achievable in the above-mentioned hexagonal ferrites compounds produced by those skilled in the art) will exhibit resonance according to the aforementioned formula at 28 GHz in the absence of an externally applied field. Use of such material in a microstrip circulator at frequencies above resonance, for example 30–35 GHz will provide an effective circulator for millimeter wave propagation which does not require an external biasing magnet.

Further objects and advantages of the present invention will become apparent to those familiar with the art upon examination of the following detailed description and accompanying drawings.

DETAILED DESCRIPTION OF THE PREFERRED EMBODIMENT

Figure 1:
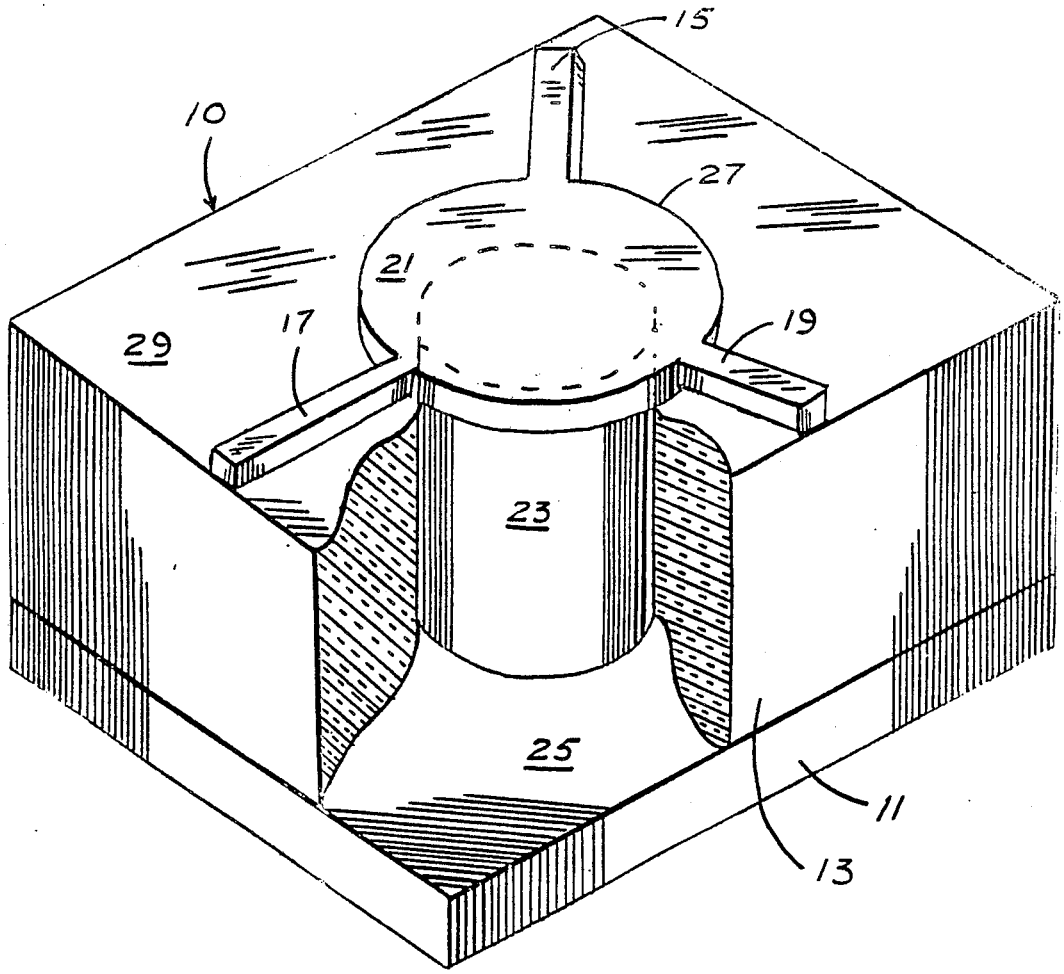
FIG. 1 is a perspective view of one preferred embodiment of the present invention.

Referring to the drawing, FIG. 1 wherein like numerals refer to like components throughout, reference numeral 10, designates generally the inventive device. Reference numeral 11 designates a metallic ground plane. A dielectric substrate 13 is disposed upon the top surface 25 of ground plane 11. Examples of suitable dielectric substrate materials for the present inventive device are quartz and Duroid TM (a Teflon TM based material). Other examples of suitable substrate materials are polyolefin, cross-linked polystryrene, alumina and ceramic-filled resins.

Deposited on the top surface 29 of the substrate 13 is a thin, metallic Y-junction film 21. Consistent with typical microstrip fabrication, the thickness of the Y-junction film may range from 0.0005 inches to 0.004 inches. The Y-junction film 21, includes three transmission arms, 15, 17, and 19, and a central generally circular region 27. A cylindrical anisotropic, aligned, uniaxial, polycrystalline hexagonal ferrite 23 is located concentrically beneath the Y-junction circular element 27. For transmission at 35 GHz, the ferrite cylinder has a height (equal to the thickness of the dielectric substrate) between 0.005 inches and 0.010 inches. The diameter of the cylinder is 0.065 inches. The height and diameter may be respectively proportionately decreased as the operating frequency increases. The hexagonal ferrite 23 is in contact with the Y-junction circular element 27 and the ground plane 11.

The anisotropy field, $H_{anis}$, of the hexagonal ferrite, 23, points either upward or downward.

In operation, each of the transmission arms, 15, 17, and 19 is well matched to other microstrip circuitry not shown in the FIGURE. Electromagnetic energy coming into the circulator 10, and guided generally through the substrate 13 along the transmission arm 15, is directed via the hexagonal ferrite, 23, outward through the substrate 13, generally along the transmission arm 19. Similarly, energy propagating inward along arm 19, is directed outward generally along arm 17. Also, energy incident along arm 17 is directed outward generally along arm 15. The net direction of preferred energy flow, with reference to FIG. 1 is in this example, clockwise. If the hexagonal ferrite 23 were turned upside down, the preferred direction of energy flow would be counter-clockwise.

The illustrative embodiment herein is merely one of those possible variations which will occur to those skilled in the art while using the inventive principles contained herein. Accordingly, numerous variations of inventions are possible while staying within the spirit and scope of invention is defined in the following claims.

What is claimed is:

1. A device comprising:

a metallic ground plane;

a substrate of dielectric material disposed upon said ground plane; said substrate having a cavity therein, said cavity extending completely through said substrate and exposing a portion of said ground plane;

a plurality of separate metallic transmission arms disposed upon the upper surface of said substrate;

a metallic junction connecting each of said transmission arms, said junction being disposed upon the upper surface of said substrate and covering said cavity;

an aligned uniaxial hexagonal ferrite centrally positioned in said cavity, said ferrite being in contact with both said ground plane and said junction, said ferrite having a resonance frequency; and electromagnetic energy having a frequency different from said resonance frequency incident in the direction of one of said transmission arms whereby said ferrite directs said electromagnetic energy to exit preferentially along the direction of a predetermined adjacent arm.

2. A device as recited in claim 1 wherein said substrate is quartz.

3. A device as recited in claim 1 wherein said substrate is a dielectric selected from the group consisting of polyolefin, cross-linked polystyrene, alumina and ceramic-filled resin.

4. A device as recited in claim 1 wherein said ferrite is barium ferrite.

5. A device as recited in claim 1 wherein said ferrite is selected from the group SrM, BaM, and NiCoW.

6. A device as recited in claim 1 wherein said transmission arms are spaced 120° apart and said junction has a circular shape.

7. A device comprising:

a metallic ground plane;

a substrate of dielectric material disposed upon said ground plane; said substrate having a cavity therein, said cavity extending completely through said substrate and exposing a portion of said ground plane;

a plurality of separate metallic transmission arms disposed upon the upper surface of said substrate;

a metallic junction connecting each of said transmission arms, said junction being disposed upon the upper surface of said substrate and covering said cavity;

an aligned uniaxial hexagonal ferrite centrally positioned in said cavity, said ferrite being in contact with both said ground plane and said junction, said ferrite having a resonance frequency; and electromagnetic energy having a frequency different from said resonance frequency incident in the direction of one of said transmission arms whereby said ferrite directs said electromagnet energy to exit preferentially along the direction of a predetermined adjacent arm, there being no external means for creating a magnetic biasing field.

* * * * *